United States Patent [19]

Coffey

[11] Patent Number: 5,222,436
[45] Date of Patent: Jun. 29, 1993

[54] PROPULSION AND STABILIZATION SYSTEM FOR MAGNETICALLY LEVITATED VEHICLES

[75] Inventor: Howard T. Coffey, Darien, Ill.

[73] Assignee: United States Department of Energy, Washington, D.C.

[21] Appl. No.: 920,736

[22] Filed: Jul. 28, 1992

[51] Int. Cl.⁵ .............................................. B60L 13/04
[52] U.S. Cl. ..................................... 104/281; 104/286
[58] Field of Search .............. 104/145, 140, 142, 139, 104/281, 282, 283, 284, 286, 290, 292, 293, 294

[56] References Cited

U.S. PATENT DOCUMENTS

| | | | |
|---|---|---|---|
| 3,717,103 | 2/1973 | Guderjahn | 104/286 |
| 3,895,585 | 7/1975 | Schwarzler | 104/281 |
| 5,094,172 | 3/1992 | Kummer | 104/282 |

FOREIGN PATENT DOCUMENTS

| | | | |
|---|---|---|---|
| 0222938 | 5/1987 | European Pat. Off. | 104/283 |
| 0210807 | 9/1987 | Japan | 104/281 |
| 0206804 | 8/1989 | Japan | 104/283 |
| 0206805 | 8/1989 | Japan | 104/283 |

*Primary Examiner*—Mark T. Le
*Attorney, Agent, or Firm*—Bradley W. Smith; Thomas G. Anderson; William R. Moser

[57] ABSTRACT

A propulsion and stabilization system for an inductive repulsion type magnetically levitated vehicle which is propelled and stabilized by a system which includes propulsion windings mounted above and parallel to vehicle-borne suspension magnets. A linear synchronous motor is part of the vehicle guideway and is mounted above and parallel to superconducting magnets attached to the magnetically levitated vehicle.

6 Claims, 4 Drawing Sheets

PROPULSION AND STABILIZATION SYSTEM FOR MAGNETICALLY LEVITATED VEHICLES

CONTRACTUAL ORIGIN OF THE INVENTION

The United States Government has rights in this invention pursuant to Contract No. W31-109-ENG-38 between the U.S. Department of Energy and the University of Chicago.

BACKGROUND OF THE INVENTION

This invention relates to a propulsion and stabilization system for an inductive repulsion type, magnetically levitated vehicle, and more specifically, to a magnetically levitated ("maglev") vehicle which is propelled and stabilized by a system which includes propulsion windings mounted above and parallel to vehicle-borne suspension magnets.

Maglev development began more than two decades ago in the United States, German, Japan, Canada and England. In the United States, renewed interest has been directed toward magnetic levitation transportation systems in view of such factors as energy conservation, high speed transportation at ground level, economic and environmental problems associated with conventional system, and composition from West Germany, France and Japan.

The use of electrodynamic suspension to provide levitation in maglev systems is well known in the prior art (see further, U.S. Pat. No. 3,470,828, issued Oct. 7, 1969, to Powell et al). A repulsive levitation (suspension) force is generated by the interaction between a magnetic field generated by superconducting magnets aboard the moving vehicle and eddy currents induced in the guideway by the time varying magnetic field of the passing magnet. The guideway can be made of a continuous sheet of a non-magnetic conductor, such as aluminum, or of discrete coils or loops of similar material. The vehicle may be advanced over the guideway by propeller, jet, rocket, or other suitable propulsion means.

The use of a linear synchronous motor (LSM) to propel a wheeled or levitated vehicle is also well known in the prior art (see further, Rhodes et al., "Magnetic Levitation for Rail Transport", 1981, pages 62-67), and several systems include a linear synchronous motor with an electrodynamic repulsion system to provide propulsion by magnetic means (see further, U.S. Pat. No. 3,815,511, issued Jun. 11, 1974, to Dukowicz et al).

The Japanese MLU-002 electrodynamic suspension system is one of the most highly developed system of this type in the world. Superconducting magnets on the vehicle react against conventional, normally conducting, coils in the guideway. In early tests, the superconducting magnets were placed in a horizontal position and reacted against horizontal coils on the bottom of the guideway. The superconducting magnets were later redesigned and located vertically, reacting with horizontal coils on the guideway for levitation and vertical coils located on the sidewalls of the guideway for guidance. The guidance coils are connected in a null-flux configuration to reduce the electromagnetic drag. Linear synchronous propulsion coils are also located on the sidewalls, but since they are symmetrically located with respect to the null-flux coils, they do not interact with them.

The basic components of the present magnetically levitated vehicle system have been identified and are well understood (see further, "Preliminary Design for a Maglev Development Facility", ANL/ESD-14). It is the object of this invention to device a configuration of those components which will achieve the highest synergy, that is, which will minimize the negative effects and maximize the positive effects of one component on the others.

The present invention departs from the prior art principally in its placement of coils for a linear synchronous motor (LSM). The LSM employs three phases of power with three distinct windings. In the prior art, the LSM coils have been placed in the roadbed below the superconducting magnets mounted on the vehicle, In some designs, these superconducting magnets are separated from the levitation magnets. The present invention places the coils of the LSM above and parallel to the superconducting magnets, and thereby achieves significant advantages. By placing the LSM coils above and parallel to the superconducting magnets mounted on the vehicle, the magnetic levitation and propulsion system of the present invention provides a constant propulsion force independent of momentary differences in suspension height and dampening of vertical motion of the vehicle. This is accomplished by dynamically varying the current in the LSM windings.

In addition, the configuration of the present invention enhances the stability of the vehicle, giving intrinsic, passive stabilization.

Further, by locating the linear synchronous motor away from the guideway, the present invention reduces the dissipation of power in the guideway by the LSM.

Also, the LSM generates a magnetic field which opposes the field generated by the onboard magnets, thereby reducing stray magnetic fields and reducing the need to shield passengers from exposure to the intense field of the vehicle magnet.

Finally, the present invention enhances the safety of the maglev system by having the vehicle magnets confined within the guideway.

Additional advantages, objects and novel features of the invention will become apparent to those skilled in the art upon examination of the following and by practice of the invention.

SUMMARY OF THE INVENTION

To achieve the foregoing and other advantages, this invention comprises a propulsion and stabilization system for an inductive repulsion type magnetically levitated vehicle which includes coils or propulsion windings of a linear synchronous motor which are part of the vehicle guideway and are mounted above and parallel to superconducting magnets which are attached to the magnetically levitated vehicle.

BRIEF DESCRIPTION OF THE DRAWINGS

The present invention is illustrated in the accompanying drawings where.

DETAILED DESCRIPTION OF THE INVENTION

Figure 1:
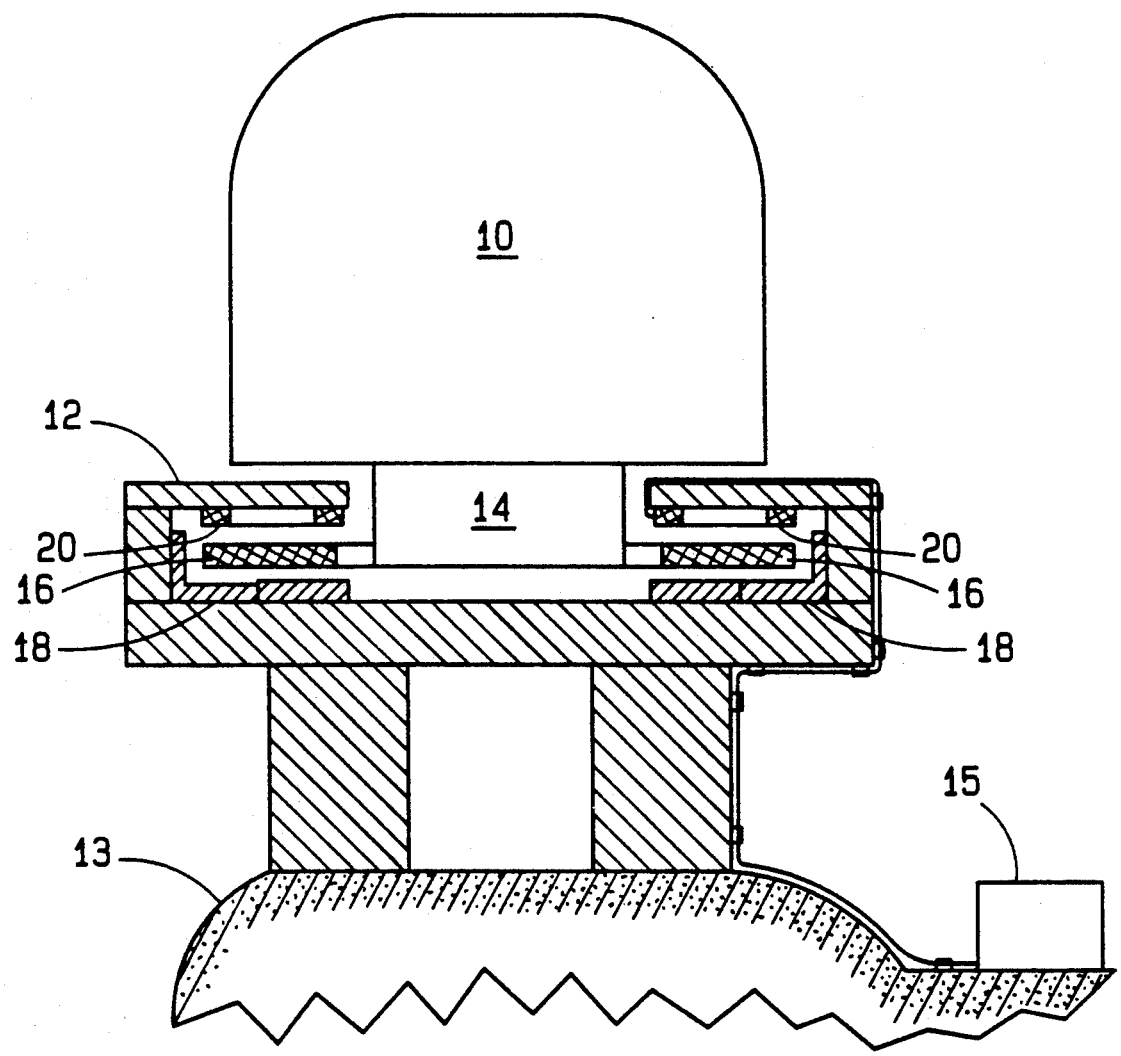
FIG. 1 is a schematic cross-section of the maglev vehicle and its electrodynamic levitation and propulsion systems of the present invention.

In the schematic cross-section of FIG. 1, vehicle 10 and its undercarriage 14 are levitated and propelled by electrodynamic systems included within support structure 12 which is anchored to roadbed 13. Support structure 12 includes beams and piers constructed of concrete or similar material enclosing undercarriage 14 and supporting the electrodynamic systems associated with the support structure 12. As shown in FIG. 1, support structure 12 may also includes means for elevation, to avoid grade crossings as well as for safety and other reasons.

The power source 15 is distinct from the support structure 12 and the roadbed 13.

Figure 2:
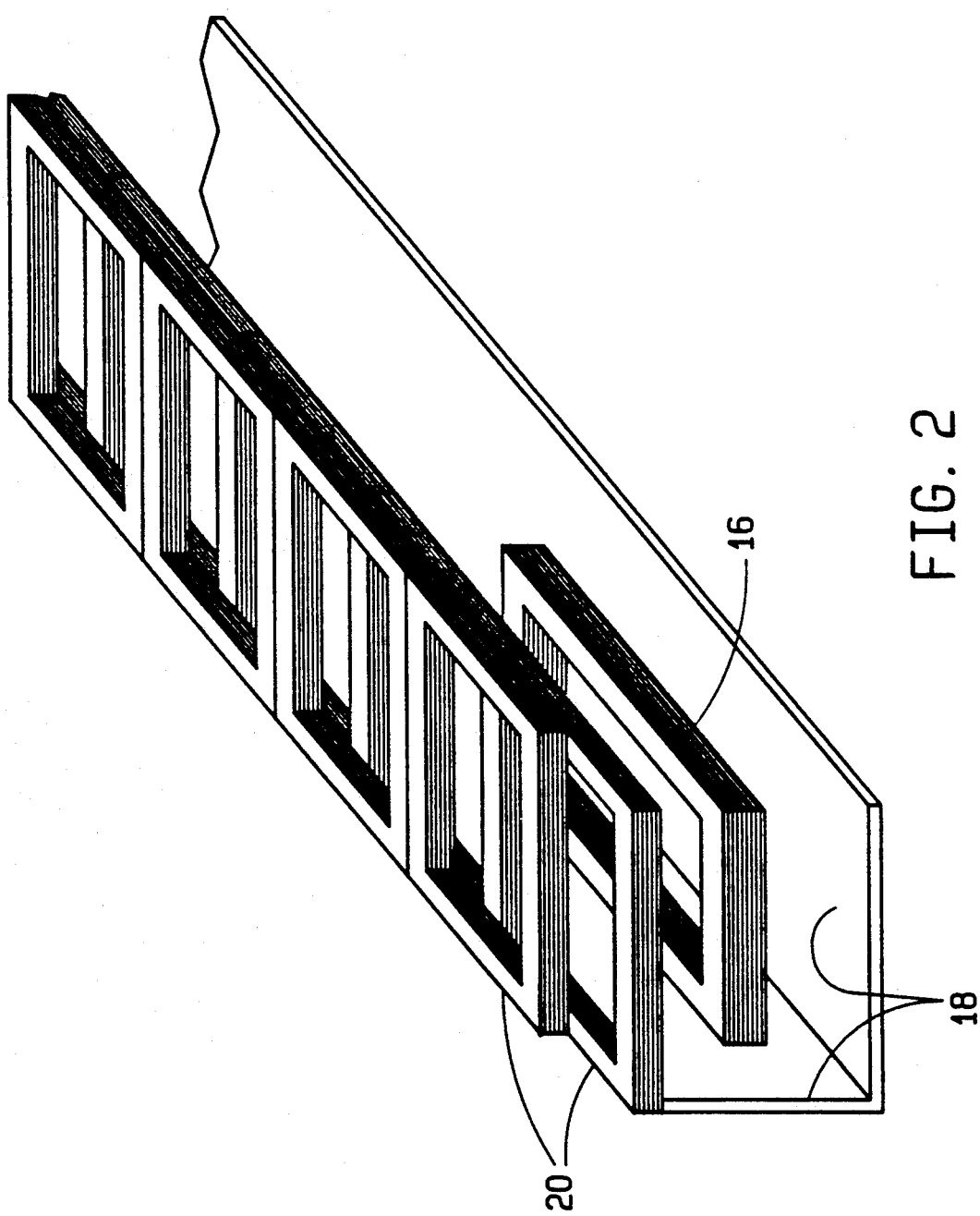
FIG. 2 is a schematic perspective view showing the relative positions of a guideway, magnet and LSM of the present invention.

The relative positions of a magnet 16, guideway 18, and linear synchronous motor 20 are depicted in greater detail in the schematic perspective view of FIG. 2., which depicts one of two mirror-image structures on either said of vehicle 10. A plurality of magnets 16 attached to undercarriage 14 are parallel to one surface of guideway 18 and perpendicular to another surface of guideway 18. Linear synchronous motor 20 and guideway 18 are attached to support structure 12 depicted in FIG. 1. Linear synchronous motor 20 is mounted parallel to and above magnet 16. As depicted in FIG. 1 both magnet 16 and linear synchronous motor 20 are approximately parallel to the ground; those skilled in the art will recognize that alternate configurations may be included in this invention.

Magnet 16 is comprised of current-carrying superconducting coils enclosed in Dewar structures (not shown) and maintained at cryogenic temperatures using appropriate refrigeration equipment (not shown). In the alternative, magnets 16 comprise permanent magnets.

Figure 4:
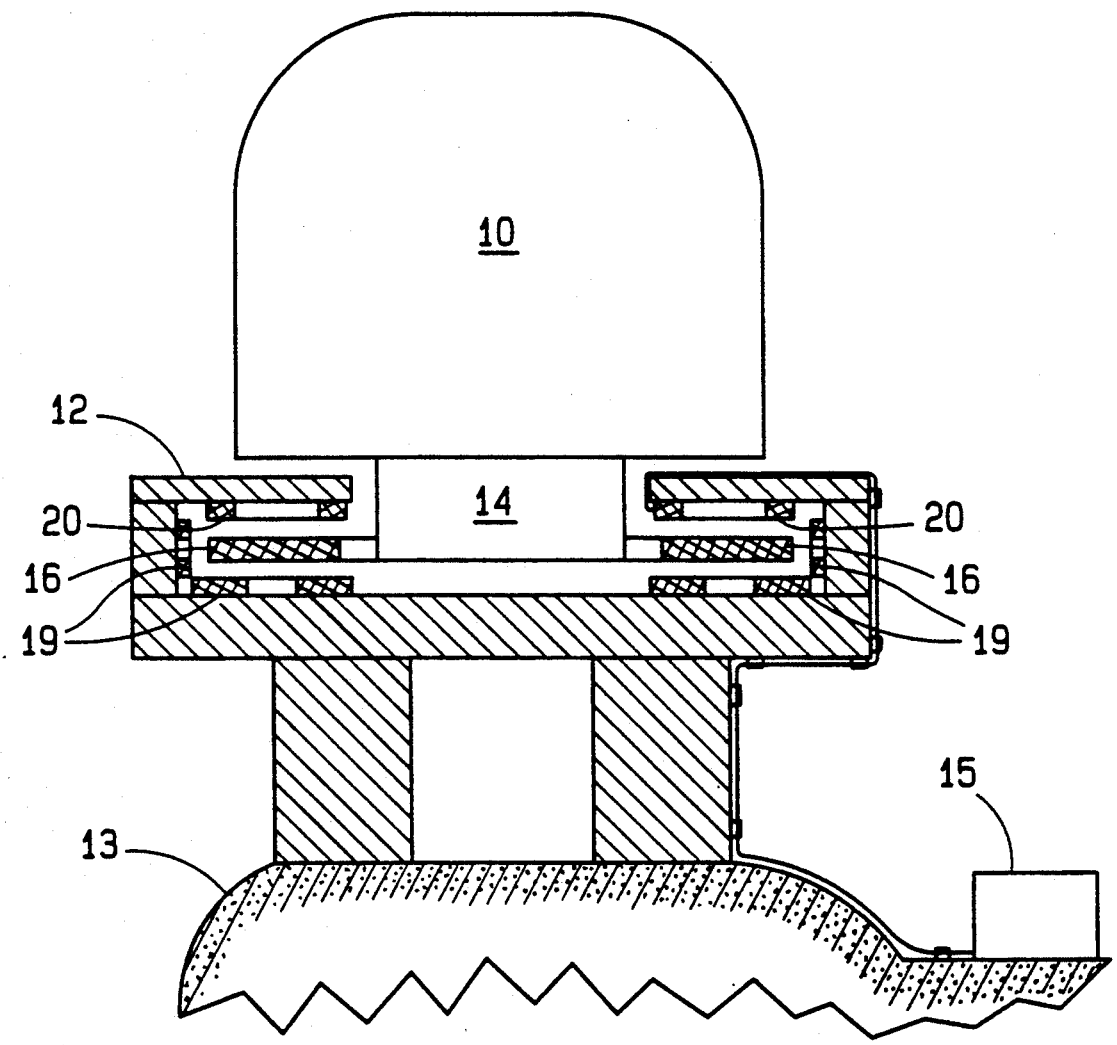
FIG. 4 is a schematic cross-section of the maglev vehicle and its electrodynamic levitation and propulsion systems where the guideway comprises a series of coils or loops.

In the preferred embodiment, guideway 18 is comprised of two "L", shaped rails constructed of a conductive, non-ferromagnetic metal such as aluminum. Alternatively, the guideway 19 in FIG. 4 may comprise coils or loops of similar conducting and non-ferromagnetic material.

In the preferred embodiment, the linear synchronous motor 20 is comprised of 3-phase windings which are known in the prior art, and capable of producing a traveling magnetic wave along the guideway.

When vehicle 10 (not shown) is in motion, a repulsive force is created between the magnet 16 and guideway 18 by the interaction of the magnet and eddy currents induced in the guideway 18 by the time varying magnetic field of the passing magnet. This repulsive force levitates magnet 16 and undercarriage 14 to maintain the vertical position of the vehicle. Because guideway 18 is "L"-shaped, repulsive forces also serve to guide vehicle 10 laterally as well; thus, the electromagnetic interaction of the magnet 16 with the guideway 18 position the vehicle both laterally and vertically. Simultaneously, the interaction between a magnetic field of magnets 16 and a magnetic field of windings in LSM 20 produces a propulsion force, moving vehicle 10 in the direction of the traveling-wave. By altering the momentary current in the propulsion coils 20 the propulsion force can be made to remain constant, regardless of momentary differences in suspension height and this means can be used to dampen vertical motions of vehicle 10.

Figure 3:
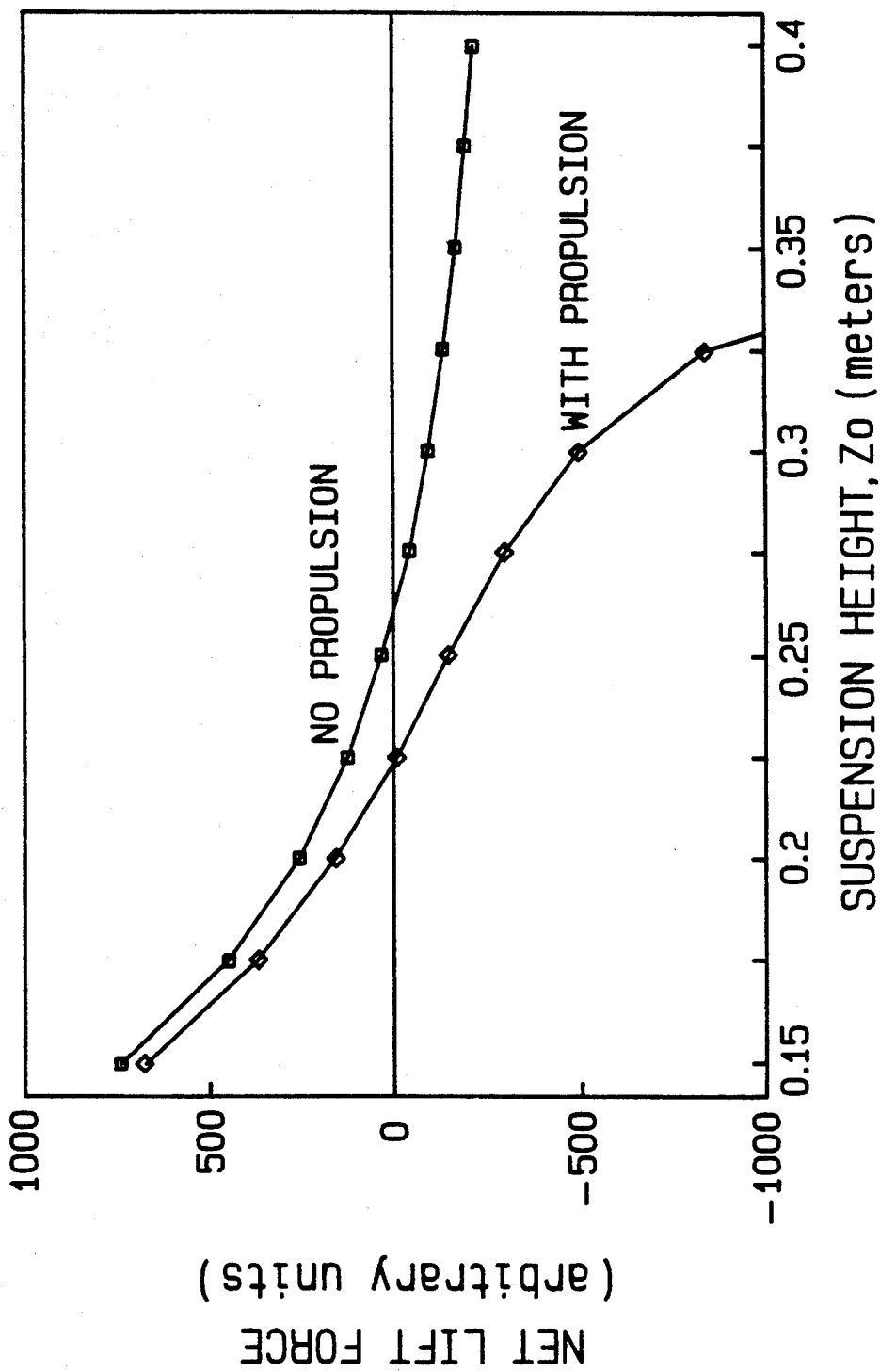
FIG. 3 is a graph depicting the net lift force on a magnet used in levitating a maglev vehicle according to the present invention.

FIG. 2 depicts another advantage of the configuration of the present invention. The graph in FIG. 3 depicts the net lift force on magnet 16. The curve labeled "No Propulsion" indicates how the levitation force on magnet 16 varies (in arbitrary units) with the distance between magnet 16 and guideway 18 in the absence of any propulsion system, that is, without LSM 20. The curve labeled "With Propulsion" shows how the levitation force on magnet 16 varies with the distance when the propulsion coils of LSM 20 are located at a height of 0.40 meters above guideway 18.

In general, the force between magnet 16 and guideway 18 varies approximately as the inverse square of the distance between the magnet 16 and the guideway 18 and as the square of the current in the magnet 16. As is known in the prior art, the lift force therefore varies approximately as $$\frac{A}{(Z_o)^2}$$

where $Z_o$ is the height of magnet 16 above guideway 18. The current in magnet 16 is contained in the constant A. Similarly, the force between magnet 16 and the coils of LSM 20 can be represented by $$\frac{-B}{(Z_p - Z_o)^2}$$

where $Z_p$ is the height of the coils of LSM 20 above the guideway 18 and where B is a term dependent on the current in the magnet 16 and the current in the LSM 20. The negative sign indicates that the force is in the downward direction.

The net lift force on vehicle 10 is the sum of the lift forces resulting from the interaction of magnets 16 with the guideway 18 and with the LSM 20 minus the weight of vehicle 10. In FIG. 3, the values $A = 25$ and $B = 4$ are assumed, and the weight of vehicle 10 is arbitrarily set at 368 to give a suspension height of about 0.25 meters when there is no propulsion force. As is evident in FIG. 3, the net lift force increases as the suspension height decreases, forcing magnet 16 back to its equilibrium height where the net lift force is zero. If vehicle 10 rises, the force becomes negative (downward) forcing vehicle 10 back to its equilibrium position. With the coils of LSM 20 in place, the restoring force in the downward direction is increased in this example, providing additional stability to the motion of magnet 16.

Further, because LSM 20 is located away from guideway 18 very little of the power generated by LSM 20 is dissipated in the guideway 18. Also, under the preferred embodiment described, with the LSM 20 oriented parallel and above the magnet 16, the interaction between the LSM 20 and the guideway 18 is reduced resulting in increased stability of the system. Since the magnetic filed generated by the coils of of LSM 20 opposes the field generated by magnet 16, the stray magnetic fields are decreased and the need to shield passengers from exposure to the field of magnet 16 is reduced. Moreover, because the magnet 16 is confined within the guideway structure by LSM 20 and the guideway 18 the overall safety of the magnetically levitated vehicle 10 is enhanced.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiments described explain the principles of the invention and practical applications and should enable others skilled in the art to utilize the invention in various embodiments and with various modifications as are suited to the particular use contemplated. It is intended that the scope of the invention be defined by the claims appended hereto.

The embodiment of this invention in which an exclusive property or privilege is claimed is defined as follows:

1. A magnetic levitation and propulsion system for a vehicle adapted to travel over a roadbed comprising:
    a guideway affixed to a support structure where said support structure is coupled to the roadbed,
    a plurality of superconducting magnet devices producing magnetic fields and affixed to the vehicle where said superconducting magnet devices are oriented parallel to one surface of said guideway to generate a repulsive force between said guideway and said magnetic devices, and
    a plurality of propulsion windings affixed to said support structure, where said propulsion windings are located above and parallel to said superconducting magnet devices and are energized by a power source to generate a vehicle propulsion force to propel the vehicle along said roadbed support structure.

2. The apparatus of claim 1 wherein said guideway is a pair of conductive sheets comprised of non-ferromagnetic material both of which are "L"-shaped and oriented in such a manner that each of the pair is the mirror image of the other, to generate a repulsive force both laterally and vertically between said guideway and said magnetic devices.

3. The apparatus of claim 1 wherein said guideway is a plurality of horizontal and vertical coils oriented to provide a repulsive force both laterally and vertically between said guideway and said magnetic device.

4. The apparatus of claim 1 wherein said power source provides a current to said propulsion windings and said current is dynamically varying.

5. The apparatus of claim 4 wherein said propulsion windings produce a magnetic field which opposes the field generated by said superconducting magnetic devices and thereby provides for a reduction in the magnetic field generated by said superconducting magnets to which the vehicle is exposed.

6. The apparatus of claim 5 wherein said propulsion windings are separated from said guideway thereby reducing power dissipation in said guideway due to a magnetic coupling between said guideway and said propulsion windings.

* * * * *